Figure 1:
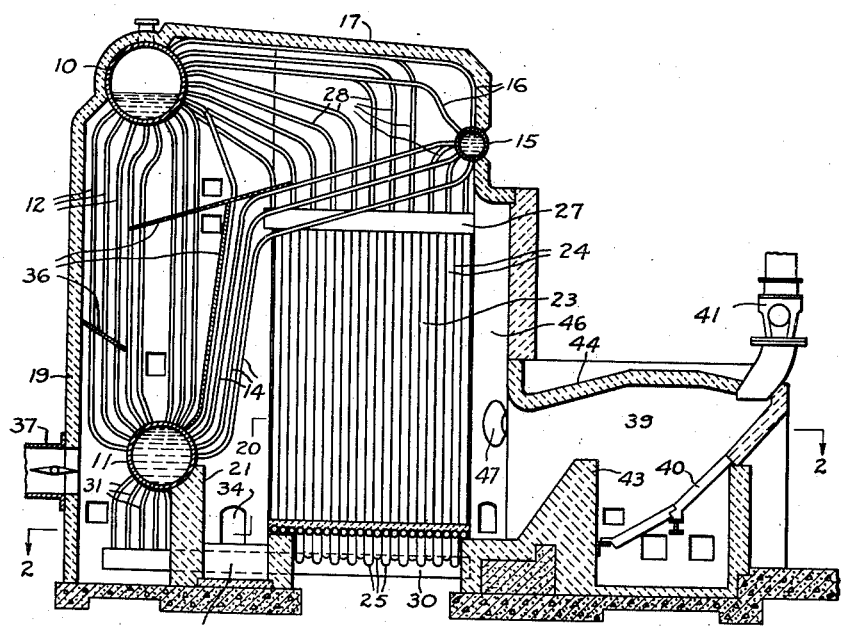

April 22, 1941.  G. A. REHM  2,239,341

FURNACE

Filed March 4, 1939

Inventor

GUSTAV A. REHM

By Albert G. Blodgett

Attorney

Patented Apr. 22, 1941

2,239,341

UNITED STATES PATENT OFFICE 2,239,341

FURNACE

Gustav A. Rehm, Worcester, Mass., assignor to Riley Stoker Corporation, Worcester, Mass., a corporation of Massachusetts Application March 4, 1939, Serial No. 259,713

8 Claims. (Cl. 122—240)

This invention relates to furnaces, and more particularly to steam generator furnaces adapted for use with fuels having widely different combustion characteristics.

In many industrial plants certain combustible waste products result from the manufacturing operations, and for economic reasons it is desirable to burn these products and utilize the heat of combustion for the generation of steam. As an example, wood-working plants produce a considerable quantity of bark, sawdust, shavings and waste pieces which should be burned. However, this waste material is ordinarily insufficient in amount to produce all the steam needed, and it is necessary to burn in addition some high grade fuel, such as oil or pulverized coal. It has been proposed heretofore to provide a main furnace for the combustion of the high grade fuel in suspension, and an auxiliary furnace for the combustion of the waste material in a fuel bed, these furnaces being so combined that the hot gases from the auxiliary furnace will flow into the main furnace. In a construction of this type the main furnace is preferably provided with water cooled walls, so that a high rate of heat release can be maintained when steam demands require it, but the auxiliary furnace is preferably provided with ceramic refractory walls adapted to become incandescent during operation and thus aid in maintaining ignition of the fuel, which usually contains a high percentage of moisture. Great care must be taken however to avoid overheating and destruction of the auxiliary furnace by reason of heat radiated thereto from the main furnace, and in the past it has been thought necessary to install a screen of water tubes between the furnaces. Such a screen is not only expensive, but it tends to chill the auxiliary furnace undesirably, particularly when the waste fuel only is being burned, and it tends to cool the hot gases from the auxiliary furnace before their combustion is completed. A further problem is presented by reason of the water cooled walls in the main furnace, since these walls render it difficult to provide the burner openings necessary for the introduction of the oil or pulverized coal.

It is accordingly one object of the invention to provide a main furnace adapted for the burning of a high grade fuel in suspension at a comparatively high rate of heat release, together with an auxiliary furnace adapted for the burning of a fuel with a relatively high moisture content, the hot gases from the auxiliary furnace passing into the main furnace, and the construction and arrangement being such as to minimize the transmission of radiant heat from the flame of the high grade fuel into the auxiliary furnace.

It is a further object of the invention to provide a new and advantageous construction for a water cooled main furnace having burners for the introduction of a high grade fuel for combustion in suspension, and an auxiliary furnace adapted for the combustion of waste material and arranged to discharge the hot gaseous products of combustion into the main furnace.

With these and other objects in view, as will be apparent to those skilled in the art, the invention resides in the combination of parts set forth in the specification and covered by the claims appended hereto.

Figure 2:
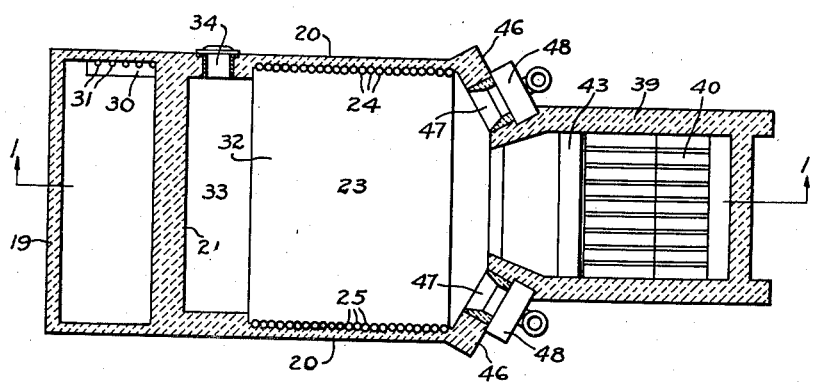

Referring to the drawing illustrating one embodiment of the invention, and in which like reference numerals indicate like parts, Fig. 1 is a longitudinal sectional view of a steam generator and the furnaces associated therewith, the section being taken on the line 1—1 of Fig. 2; and Fig. 2 is a section on the line 2—2 of Fig. 1.

The embodiment illustrated comprises an upper transverse steam-and-water drum 10 and a lower transverse water drum 11 therebeneath, these drums being connected by a bank of upright water tubes 12. From the front of the lower drum 11 a bank of water tubes 14 extends upwardly, these tubes being generally L-shaped, with upright lower portions located in front of the tubes 12 and with upper portions which slope slightly upwardly and forwardly to a front transverse header or small drum 15. This header 15 is connected to the steam-and-water drum 10 by water tubes 16, these tubes forming a support for a roof 17 of refractory material.

A wall 19 is provided in the rear of the tube bank 12, and two walls 20 extend forwardly from the rear wall 19 on opposite sides of the water tubes to a transverse vertical plane located adjacent to the front header 15. A transverse bridge wall 21 is located in front of and beneath the lower water drum 11. The space 23 in front of the water tubes 14 and between the forward portions of the side walls 20 is utilized as a main furnace or combustion chamber in which a comparatively high grade fuel is burned in suspension. The walls 20 on opposite sides of the furnace 23 are lined with closely spaced upright water wall tubes 24 and 25 respectively which are preferably fully exposed to the combustion flame and adapted to absorb radiant heat therefrom at a high rate. The upper ends of the water wall tubes are connected to longitudinally extending headers 27 which in turn are connected to the steam-and-water drum 10 or the front header 15 by means of water tubes 28. The lower ends of the water wall tubes 24 are connected to a longitudinally extending header 30 which is supplied with water by means of tubes 31 leading downwardly from the water drum 11. The lower portions of the water wall tubes 25 are bent laterally and extend across the bottom of the furnace 23 to connect with the header 30, these transversely extending portions of the tubes serving to support refractory material 32 which forms a floor for the combustion chamber. Between the rear edge of the floor 32 and the bridge wall 21 there is provided an ash pocket 33 arranged to receive the ash when pulverized coal is being burned, one side wall 20 having an opening 34 therein through which the ash may be removed. Suitable baffles 36 are arranged to direct the hot gaseous products of combustion from the furnace 23 into proper contact with the water tubes 14 and 12, and thence to a gas outlet duct 37 located at the rear of the lower drum 11.

In front of the main furnace 23 there is provided an auxiliary furnace 39 somewhat narrower than the main furnace. The auxiliary furnace is constructed with ceramic refractory walls and adapted for the combustion of waste material such as bark, sawdust, shavings or small pieces of wood, and particularly waste combustible material containing relatively high percentages of moisture. This furnace 39 is provided with a grate 40 to which the combustible matter is delivered by means of a suitable feeding mechanism 41. In the rear of the grate there is located a transverse bridge wall 43 over which the gaseous products of combustion pass rearwardly into the main combustion chamber 23. The roof 44 of the auxiliary furnace is inclined downwardly and rearwardly above the bridge wall.

A comparatively high grade fuel, such as oil or pulverized coal, is burned in suspension in the main combustion chamber 23, and this fuel is introduced into the front portion of the combustion chamber in two substantially horizontal streams directed generally rearwardly from opposite sides of the auxiliary furnace 39. These streams preferably converge toward the rear and consequently diverge from the side walls 20, so that flame impingement on the side walls is avoided. In the preferred construction illustrated two wing walls 46 are provided on opposite sides of the auxiliary furnace 39, these walls extending laterally from the rear portion of the auxiliary furnace to the front portions of the side walls 20 and meeting these side walls at obtuse angles. Each wing wall 46 is provided with a burner opening 47 and a burner 48 for the introduction of the fuel substantially horizontally therethrough. The burner openings 47 are preferably located at a comparatively low elevation in order to take full advantage of the height of the combustion space 23.

It will now be apparent that the burners 48 will project two rearwardly converging streams of fuel and air into the lower portion of the main furnace 23, substantially filling this furnace with flame without impingement on any of the walls. The closely-spaced bare water wall tubes 24 and 25 will absorb radiant heat with great rapidity, and the same is true of the water tubes 14, so that a high rate of combustion may be maintained without difficulty. Since the flames from the burners 48 are directed rearwardly away from the auxiliary furnace 39, the radiation of heat into the auxiliary furnace will be greatly reduced, and it will be unnecessary to provide a protecting screen of water tubes. Hence there will be no tendency for such water tubes to cool the auxiliary furnace and the gases issuing therefrom, and the auxiliary furnace can be maintained at a sufficiently high temperature for the combustion of high-moisture waste fuel even with the burners 48 shut down. By introducing the high grade fuel through the wing walls 46 rather than through the side walls 20 a further advantage is realized in that there is no bending of the water wall tubes to make room for a burner opening, and the water wall tubes can be spaced as closely as may be desired without interfering with the introduction of the fuel streams.

Having thus described my invention, what I claim as new and desire to secure by Letters Patent is:

1. A multiple furnace installation comprising a main furnace adapted for the combustion of fuel in suspension, an auxiliary furnace somewhat narrower than the main furnace located in front of the main furnace and adapted for the combustion of fuel having a high moisture content, the hot gaseous products of combustion flowing rearwardly from the auxiliary furnace into the main furnace, and burner means located at one side of the auxiliary furnace and arranged to project a stream of fuel generally rearwardly and substantially horizontally into the lower portion of the main furnace for combustion in suspension therein.

2. A multiple furnace installation comprising a main furnace adapted for the combustion of fuel in suspension, an auxiliary furnace somewhat narrower than the main furnace located in front of the main furnace and adapted for the combustion of fuel having a high moisture content, the hot gaseous products of combustion flowing rearwardly from the auxiliary furnace into the main furnace, and burner means located on opposite sides of the auxiliary furnace and arranged to project streams of fuel generally rearwardly and substantially horizontally into the lower portion of the main furnace for combustion in suspension therein.

3. A multiple furnace installation comprising a main furnace adapted for the combustion of fuel in suspension, an auxiliary furnace located in front of the main furnace and adapted for the combustion of fuel having a high moisture content, the hot gaseous products of combustion flowing rearwardly from the auxiliary furnace into the main furnace, and burner means located on opposite sides of the auxiliary furnace and arranged to project two rearwardly converging streams of fuel into the main furnace for combustion in suspension therein.

4. A multiple furnace installation comprising a main furnace having water cooled side walls and adapted for the combustion of fuel in suspension at a comparatively high rate of heat release, an auxiliary furnace located in front of the main furnace and having ceramic refractory walls, the auxiliary furnace being adapted for the combustion of fuel having a high moisture content and the hot gaseous products of combustion flowing rearwardly therefrom into the main furnace, and burner means located on opposite sides of the auxiliary furnace and arranged to project two rearwardly converging streams of fuel into the main furnace for combustion in suspension therein.

5. A multiple furnace installation comprising a main furnace having two opposed water cooled side walls and adapted for the combustion of fuel in suspension at a comparatively high rate of heat release, an auxiliary furnace somewhat narrower than the main furnace located in front of the main furnace and having ceramic refractory walls, the auxiliary furnace being adapted for the combustion of fuel having a high moisture content and the hot gaseous products of combustion flowing rearwardly therefrom into the main furnace, walls extending laterally from opposite sides of the auxiliary furnace to the front portions of the water cooled side walls, each laterally extending wall having a burner opening therein, and burners associated with said openings to project streams of fuel generally rearwardly and substantially horizontally therethrough into the lower portion of the main furnace for combustion in suspension therein.

6. A multiple furnace installation comprising a main furnace having two opposed water cooled side walls and adapted for the combustion of fuel in suspension at a comparatively high rate of heat release, an auxiliary furnace located in front of the main furnace and having ceramic refractory walls, the auxiliary furnace being adapted for the combustion of fuel having a high moisture content and the hot gaseous products of combustion flowing rearwardly therefrom into the main furnace, wing walls extending laterally from opposite sides of the auxiliary furnace to the front portions of the water cooled side walls and meeting these side walls at obtuse angles, each wing wall having a burner opening therein, and burners associated with said openings to project streams of fuel rearwardly therethrough into the main furnace for combustion in suspension therein, the said fuel streams converging in the rearward direction.

7. A multiple furnace installation comprising a main furnace having a side wall and adapted for the combustion of fuel in suspension, an auxiliary furnace in front of the main furnace and adapted for the combustion of fuel having a high moisture content, the hot gaseous products of combustion flowing rearwardly from the auxiliary furnace into the main furnace, a wall extending laterally from the auxiliary furnace to the front portion of the side wall, said laterally extending wall having a burner opening therein, and a burner associated with said opening to project a stream of fuel rearwardly therethrough into the main furnace for combustion in suspension therein, the said fuel stream diverging from the side wall in the rearward direction.

8. A multiple furnace installation comprising a main furnace having a water cooled side wall and adapted for the combustion of fuel in suspension at a comparatively high rate of heat release, an auxiliary furnace located in front of the main furnace and having ceramic refractory walls, the auxiliary furnace being adapted for the combustion of fuel having a high moisture content and the hot gaseous products of combustion flowing rearwardly therefrom into the main furnace, a wall extending laterally from the auxiliary furnace to the front portion of the water cooled side wall, said laterally extending wall having a burner opening therein, and a burner associated with said opening to project a stream of fuel rearwardly therethrough into the main furnace for combustion in suspension therein, the said fuel stream diverging from the water cooled side wall in the rearward direction.

GUSTAV A. REHM.